United States Patent
Furuta et al.

(10) Patent No.: US 7,226,211 B2
(45) Date of Patent: Jun. 5, 2007

(54) SHAFT FOR FLUID DYNAMIC BEARING, FLUID DYNAMIC BEARING DEVICE, AND METHOD OF MANUFACTURING THE SHAFT

(75) Inventors: Eijiro Furuta, Yokohama (JP); Kenji Kayama, Yokohama (JP); Michiya Masuda, Yokohama (JP)

(73) Assignee: NHK Spring Co., Ltd, Kanagawa (JP)

( * ) Notice: Subject to any disclaimer, the term of this patent is extended or adjusted under 35 U.S.C. 154(b) by 123 days.

(21) Appl. No.: 10/957,015

(22) Filed: Oct. 1, 2004

(65) Prior Publication Data

US 2005/0078893 A1    Apr. 14, 2005

Related U.S. Application Data

(63) Continuation of application No. PCT/JP2004/001130, filed on Feb. 4, 2004.

(30) Foreign Application Priority Data

Feb. 4, 2003 (JP) .............................. 2003-027383

(51) Int. Cl.
   *F16C 32/06* (2006.01)
(52) U.S. Cl. ...................... 384/100; 384/114
(58) Field of Classification Search ............... 384/100, 384/107–120; 29/898.02
   See application file for complete search history.

(56) References Cited

U.S. PATENT DOCUMENTS

| | | | |
|---|---|---|---|
| 5,271,677 A * | 12/1993 | Sherman et al. ............ | 384/114 |
| 5,593,230 A | 1/1997 | Tempest et al. ............ | 384/100 |
| 5,628,567 A | 5/1997 | Murabe et al. ............ | 384/100 |
| 5,731,831 A | 3/1998 | Murabe et al. ............ | 347/259 |
| 5,746,515 A | 5/1998 | Takahashi et al. ........... | 384/115 |
| 5,795,072 A * | 8/1998 | Hwang ........................ | 384/100 |
| 6,024,493 A | 2/2000 | Tempest et al. ............ | 384/114 |
| 6,123,460 A | 9/2000 | Tekeuchi et al. ............ | 384/100 |

FOREIGN PATENT DOCUMENTS

| | | | | |
|---|---|---|---|---|
| JP | 63106416 A | * | 5/1988 | .................. 384/100 |
| JP | 7-145812 | | 6/1995 | |
| JP | 7-230056 | | 8/1995 | |
| JP | 7-259837 | | 10/1995 | |
| JP | 9-144749 | | 6/1997 | |
| JP | 10-43906 | | 2/1998 | |
| JP | 11-2234 | | 1/1999 | |
| JP | 2000-227119 | | 8/2000 | |
| WO | WO 98/38433 | | 9/1998 | |

* cited by examiner

*Primary Examiner*—Thomas R. Hannon
(74) *Attorney, Agent, or Firm*—Ohlandt, Greeley, Ruggiero & Perle, L.L.P.

(57) ABSTRACT

In a method of manufacturing a shaft for the fluid dynamic bearing device, the shaft is formed with a plurality of grooves arranged in and around the external circumference, the surface of the grooves and external circumference with uniform roughness, and machined marks on the surface aligned in the circumferential direction, by controlling the relative vibration of a rod-shaped blank to be machined as the shaft for a fluid dynamic bearing and a grinding wheel (a machining tool) to grind the external circumference of the blank.

18 Claims, 9 Drawing Sheets

SHAFT FOR FLUID DYNAMIC BEARING, FLUID DYNAMIC BEARING DEVICE, AND METHOD OF MANUFACTURING THE SHAFT

CROSS-REFERENCE TO RELATED APPLICATIONS

This is a Continuation Application of PCT Application No. PCT/JP2004/001130, filed Feb. 4, 2004, which was published under PCT Article 21(2) in Japanese.

This application is based upon and claims the benefit of priority from prior Japanese Patent Application No. 2003-027383, filed Feb. 4, 2003, the entire contents of which are incorporated herein by reference.

BACKGROUND OF THE INVENTION

1. Field of the Invention

The present invention relates to a shaft for a fluid dynamic bearing device, which has an external circumference shaped to generate a fluid dynamic in a clearance to a bearing when rotated relatively to the bearing, a fluid dynamic bearing device having the shaft, and a method of manufacturing the shaft.

2. Description of the Related Art

In a certain type of fluid dynamic bearing, grooves are formed in the direction across the sliding direction in at least one of a bearing surface of a shaft and a bearing, to improve the stability of the axis of rotation. The grooves are available in two types, the herringbone type (e.g., Jpn. Pat. Appln. KOKAI Publication No. 2000-227119), and the type arranged parallel to the axis of rotation (e.g., International Pat. Appln. KOKAI Publication No. 98/38433).

Another type of dynamic air pressure bearing device has a fixed shaft, and a hollow rotation shaft fit with clearance to the external circumference of the fixed shaft. The external circumference of the fixed shaft is shaped to be an equal-radius multi-arc, or equal-radius ellipse. A gap between the external circumference of the fixed shaft and the internal circumference of the hollow rotation shaft is shaped like odd numbers of (three) sine waves. This type is used for an optical deflector. (For example, Jpn. Pat. Appln. KOKAI Publication No. 7-230056.) The surface of the shaft is anodized.

A fluid dynamic bearing device and a shaft for a fluid dynamic bearing according to the invention is a rotating body, which rotates one way or two ways (forward and reverse) at a low speed or a high speed, or rotates continuously or intermittently, or a member which supports the rotating body. The rotating body or the member supporting the rotating body has a function of moving a lubricating medium in the circumferential or longitudinal direction by rotation, and stabilizes rotation by decreasing sliding resistance.

It is necessary to increase the number of grooves and form the grooves more precisely for increasing the rotation accuracy of a fluid dynamic bearing device to the extent that generation of a half whirl in a high rotation frequency range of the fluid dynamic bearing device is controlled, and the shaft and bearing are stably rotated even at a low rotation frequency without colliding with each other. The herringbone grooves are formed by etching, shotblasting or shot-peening a masked rod-shaped material to reduce the machining cost. In these machining processes, it is difficult to increase the machining accuracy above than a certain level. As the rotation characteristics differ depending on the direction of the herringbone pattern, it is required to take account of the rotating direction when assembling the bearing device.

When grooves are formed in the direction along the axis of rotation by etching, shotblasting, shot peening, grinding or laser machining, a discontinued part is formed in the boundary between the grooves and the external circumference. Thus, when the rotation frequency increases, a separation layer easily occurs in the downstream side of the rotation from the discontinued part. Formation of a separation layer may cause a failure to generate a desired fluid dynamic between the shaft and the bearing.

Further, in any machining method, a process to increase the circularity of shaft and bearing is necessary in addition to a process of forming grooves. A shaft exposed to the processes of forming grooves and increasing the circularity must exhibit the machining and positioning accuracy with high reproducibility in each process. Thus, it is difficult to decrease the cost of machining the shaft.

BRIEF SUMMARY OF THE INVENTION

It is an object of the present invention to provide a shaft for a fluid dynamic bearing, which has the rotation stability to control a half whirl and decrease the rotation frequency at start of contact between a shaft and a bearing in a low rotation frequency range, a fluid dynamic bearing device having the shaft, and a method of manufacturing the shaft for a fluid dynamic bearing with a high accuracy at a low cost.

A shaft for a fluid dynamic bearing according to the present invention has a plurality of grooves arranged in and around the external circumference, a surface of the grooves and external circumference with a uniform roughness, and machined marks on the surface aligned in the circumferential direction. The grooves are at least partially continued to minimize deflection of the rotation shaft for a fluid dynamic bearing. The grooves are formed parallel to the axis of rotation to stabilize the distribution along the axial direction of the force acting in the radial direction of the rotation shaft. The grooves are formed so that the phase in the rotating direction centering on the axis of rotation changes along the center of the shaft, to control the flow direction of the fluid in the grooves. The grooves are formed so that the external circumference is changed like a sine wave in the radial direction along the circumference, to prevent deviation of the rotation shaft stability to the rotating direction, and to smooth the contact between the shaft and a bearing.

A fluid dynamic bearing device according to the present invention include a shaft which has a plurality of grooves arranged in and around the external circumference, the surface of the grooves and external circumference with uniform roughness, and machined marks on the surface aligned in the circumferential direction; and a bearing which has a cylindrical internal circumference surrounding the external circumference of the shaft.

A method of manufacturing a shaft for a fluid dynamic bearing according to the present invention, the shaft is formed having a plurality of grooves arranged in and around the external circumference, the surface of the grooves and external circumference with a uniform roughness, and machined marks on the surface aligned in the circumferential direction, by controlling the relative vibration between a rod-shaped blank which is to be machined as the shaft and a tool which machines the external circumference of the blank. The controlled vibration is the self-induced vibration generated between the blank and tool, or the forced vibration generated in a machine which has a machining tool.

According to a method of manufacturing a shaft for a fluid dynamic bearing in the present invention, the shaft is formed with a plurality of grooves arranged in and around the external circumference of a rod-shaped blank to be machined by a centerless grinder as a shaft for a fluid dynamic bearing, by vibrating the blank by self-induced vibration during the machining process. The grooves are smoothly continued to the external circumference, and arranged with equal intervals in and around the external circumference, by controlling the frequency of self-induced vibration. When manufacturing a shaft for a fluid dynamic bearing which is different in at least one of the number and depth of the grooves, change at least one of the grinding conditions of a centerless grinder, that is, the rotation frequency of a regulating wheel, the hardness of a regulating wheel, the rotation frequency of a grinding wheel, the grain size of a grinding wheel, the hardness of the bonding agent of a grinding wheel, the grain density of a grinding wheel, the apex angle of a blade, the center height of blank, the center height angle against a grinding wheel, the center height angle against a regulating wheel, the tilt angle of the axis of rotation of a regulating wheel against the axis of rotation of blank, and the depth of cut by a grinding wheel against blank. The rotation frequency of at least one of the regulating wheel and the grinding wheel of the centerless grinder, or the center height of blank is changed during the machining process, to form the grooves in which the phase in the rotating direction centering on the axis of shaft changes along the direction of the axis. The rotation shaft for the grinding wheel of a centerless grinder is forcibly vibrated or the amplitude of the vibration that is generated on the rotation axis is changed, to change the depth of the grooves.

According to a method of manufacturing a shaft for a fluid dynamic bearing in the present invention, the shaft for fluid dynamic bearing is formed with a plurality of grooves arranged in and around the external circumference, the surface of the grooves and external circumference with uniform roughness, and machined marks on the surface aligned in the circumferential direction, by making chatter between a rod-shaped blank to be machined as the shaft and a cylindrical grinder having a grinding wheel to grind the external circumference of the blank. Or, a shaft for a fluid dynamic bearing is formed with a plurality of grooves arranged in and around the external circumference, the surface of the grooves and external circumference with uniform roughness, and machined marks on the surface aligned in the circumferential direction, by making chatter a rod-shaped blank to be machined as the shaft and a cutting grinder having a blade to cut the external circumference of the blank.

A shaft for a fluid dynamic bearing according to the present invention has a plurality of grooves in the external circumference which generates a fluid dynamic when rotated relatively to a bearing externally inserted onto the shaft centering around the axis of rotation. The grooves are extended by a certain length on the external circumference in the direction along the axis of rotation, and the radius of the shaft is gently changed along the circumference. The depth D of the grooves which is a dimensional difference between the maximum value and minimum value of the radius is in a range of 0.1–100 µm. Assume that an average circle circumscribing this circumferential shape is developed to be a straight line. Then, the profile f(θ) of the external circumference of the shaft along the direction across perpendicularly the axis of rotation is expressed by the following polynomial expression:

$$f(\theta) = \sum_{n=1}^{\infty} \frac{K_n}{2} \sin(n\theta)$$

where θ is the azimuth.

In this case, the following conditions shall be satisfied:

$$0.1 \leq \frac{K_n}{2} \leq 100 \ [\mu m]$$

$$0 < K_{n+1} \leq \frac{K_n}{2} \ [\mu m]$$

$$D = f(\theta)_{MAX} - f(\theta)_{MIN}.$$

A shaft for a fluid dynamic bearing according to the present invention has odd number of grooves extending continuously from one end to the other end in the direction across the plane perpendicular to the axis of rotation are arranged in rotation symmetry centering on the axis of rotation. The profile of the external shape along the circumference, which is developed, extending the change amount in the radial direction centering on the axis of rotation, is like a sine wave. The number of the grooves is preferably an odd number selected from 3 to 15.

An odd number is desirable from a viewpoint of rotation stability. However, if the odd number is larger than 15, the shape of the external circumference is close to a circle, the generated fluid dynamic is dispersed, and a desired effect cannot be obtained. Though the lower limit value is 3, the rotation may be unstable in the high-speed side with an odd number 3. In a range of 5–9, the machining stability (reproducibility) is good, the yield is improved, and excellent characteristics can be obtained.

A fluid dynamic bearing device according to the present invention has a shaft and a bearing inserted externally onto the shaft. The shaft has a plurality of grooves in the external circumference, which generates a fluid dynamic, when the shaft rotated relatively to the bearing centering on the axis of rotation. The grooves are extended by a certain length in the external circumference in the direction along the axis of rotation, and the radius of the shaft is gently changed along the circumference. The depth D of the grooves which is a dimensional difference between the maximum value and minimum values of the radius is preferably in a range of 0.1–100 µm. In this fluid dynamic bearing device, the bearing is fixed, and the shaft is rotated. When the diameter of a cylindrical surface circumscribing the shaft is assumed to be Φ, the average value of the dimensions in the radial direction from the cylindrical surface to the external circumference of shaft is assumed to be $D_{AVE}$, and the average dimension of the diameter clearance between the internal circumference surface of the bearing and cylindrical surface circumscribing the shaft is assumed to be C, they preferably have the relationship expressed by $\{D_{AVE}+(C/2)\}/\Phi \leq 7.5 \times 10^{-4}$.

At least one of the shaft and the bearing is preferably made of alumina, silicon nitride, zirconia, aluminum nitride, case hardened steel, spring steel, alloy tool steel, managing steel, titanium alloy, aluminum, stainless steel, or at least one of the materials made by coating the base metal of these materials by plating or spraying.

DETAILED DESCRIPTION OF THE INVENTION

Figure 1:
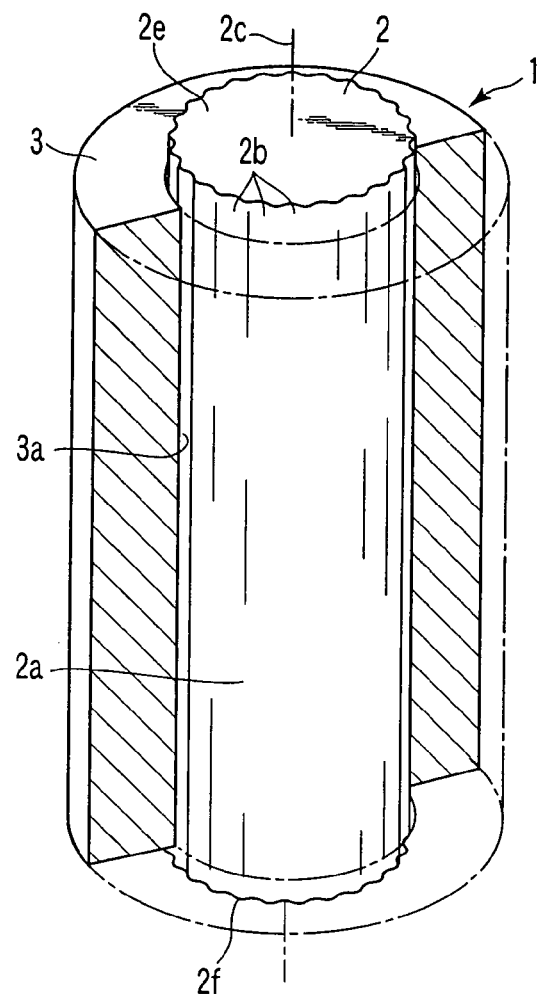
FIG. 1 is a partially sectional perspective view showing schematically a bearing of a fluid dynamic bearing device according to a first embodiment of the present invention.

A fluid dynamic bearing device 1 according to a first embodiment of the present invention will be explained hereinafter with reference to the accompanying drawings FIG. 1 to FIG. 8. As shown in FIG. 1, a fluid dynamic bearing device 1 has a shaft 2 and a bearing 3. The shaft 2 is formed with a plurality of grooves 2b (25 grooves in FIG. 1 to FIG. 4) in an external circumference 2a. In this embodiment, the depth D of the grooves 2b is shown larger than the actual depth to clarify the grooves. For example, when the diameter (maximum) of the shaft 2 is about 10 mm in the fluid dynamic bearing device 1 using air as a fluid, the depth D of the grooves 2b shown in FIG. 2 is about several micrometers.

The depth D of the grooves 2b is preferably set larger proportional to the diameter of the shaft 2. According to the principle of generating a fluid dynamic, the depth D of the grooves 2b is set to a range of 1–100 µm, not proportional to the shaft diameter, but depending on the rotation frequency to be used. The grooves forming stability is greatly increased with the depth of 0.5 µm or larger, and the effect is much increased with the depth of 10 µm or lower.

Figure 3:
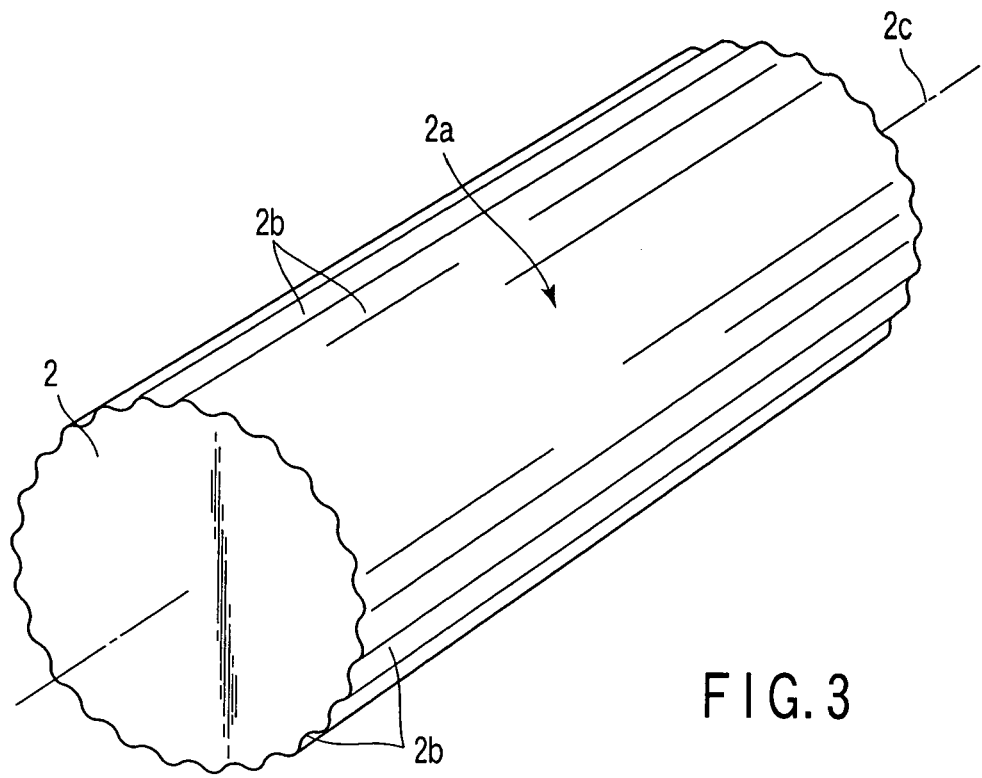
FIG. 3 is a perspective view of the shaft shown in FIG. 1.
Figure 4:
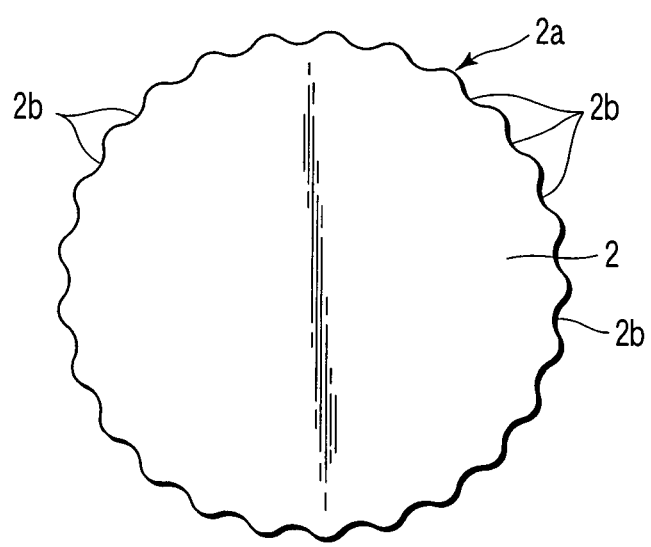
FIG. 4 is a sectional view of the shaft crossing at a right angle to the center of the shaft shown in FIG. 3.

The grooves 2b are formed continuously from one end to the other end parallel to the axis of rotation 2c of the shaft 2, as shown in FIG. 3, and arranged around the external circumference 2a with equal intervals, as shown in FIG. 4. The grooves 2b and external circumference 2a have the surface roughness which are even, and the machined marks aligned in the circumferential direction. The machined marks mentioned in this specification means a remarkable stripe formed by the elimination machining.

Figure 2:
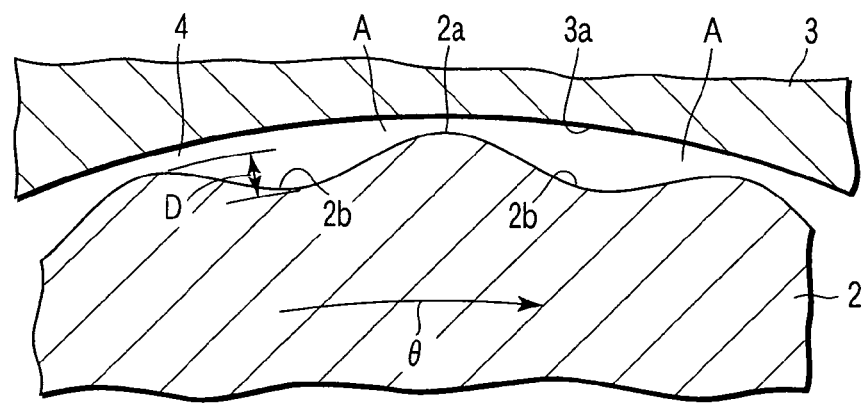
FIG. 2 is a partially magnified view of the sectional view across the center of the shaft and the axis of the bearing shown in FIG. 1.

As shown in FIG. 2 and FIG. 4, the grooves 2b are smoothly continued from the external circumference 2a. In this embodiment, the grooves 2b are formed by smoothly changing the external circumferential shape 2a in the radial direction as a sine wave along the circumferential direction. The bearing unit 3 has a cylindrical internal circumference 3a surrounding the external circumference 2a of the shaft 2. A gap 4 of the size to form a fluid film is formed between the internal circumference 3a and the external circumference 2a of the shaft 2.

In the fluid dynamic bearing device 1 configured as described above, the sectional shape of the grooves 2b is symmetrical with the rotating direction. Therefore, when the shaft 2 and bearing 3 are relatively rotated, the rotation characteristics are the same in either rotating direction. Namely, the load torque acting upon start and stop of rotation is the same, and becoming in contact with each other at the start and stop of rotation, the frictional conditions of the external circumference 2a of the shaft 2 and the internal circumference 3a of the bearing 3 are the same. Thus, the durability of the fluid dynamic bearing 1 does not differ in any rotating direction. It will be obtained the same running performance such as the time required to stabilize rotation, the rotation frequency to provide stable rotation and so on, in either rotating direction.

Since the grooves 2b are smoothly continued to the external circumference 2a, turbulence is difficult to induce in the flow in the downstream side of the rotating direction from the external circumference 2a to the grooves 2b where the gap 4 between the shaft 2 and the bearing 3 spreads (concretely, the part A, when the shaft 2 is rotated in the arrow direction in FIG. 2). Further, the surface roughness of the grooves 2b and the external circumference 2a of the shaft 2 have the uniform roughness of surface and the machined marks aligned in the circumferential direction. Therefore, when the shaft 2 for the fluid dynamic bearing device 1 is rotated relatively with the bearing 3, the fluid between the external circumference 2a and grooves 2b of the shaft 2 and the internal circumference 3a of the bearing 3 flows along the machined marks, and turbulence is difficult to induce, and the fluid separation is difficult to induce in the downstream side. Thus, the axis of rotation 2c is easy to stabilize in a wide range from a low frequency range where the rotation speed is slow, to a high frequency range where the rotation speed is high, with respect to the relative rotation speed of the shaft 2 and the bearing 3.

Figure 5:
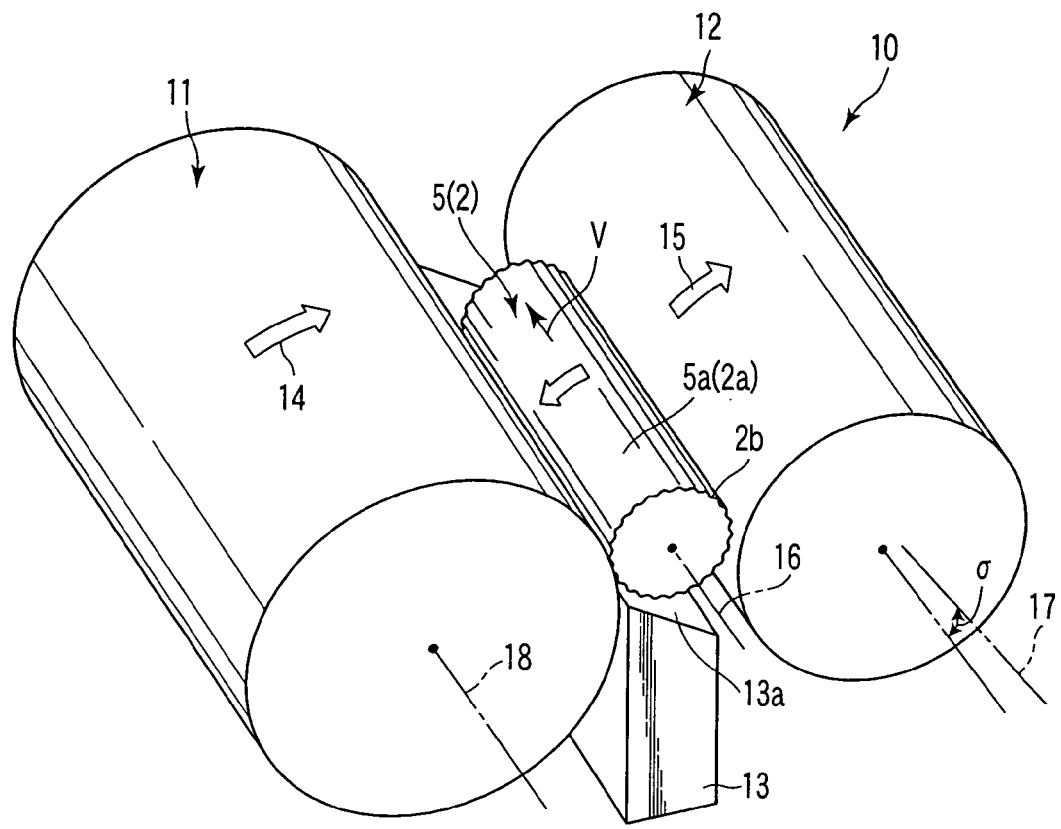
FIG. 5 is a schematic perspective view showing the state of machining the shaft shown in FIG. 3 by a centerless grinder.

Next, description will be given on a method of manufacturing the shaft 2 with reference to FIG. 5 and FIG. 6. The shaft 2 is machined by a centerless grinder 10 as shown in FIG. 5. The centerless grinder 10 has a grinding wheel 11, a regulating wheel 12 and a blade 13. The grinding wheel 11 grinds the external circumference 5a of a rod-shaped blank 5 to be machined as the shaft 2 for a fluid dynamic bearing. The regulating wheel 12 rotates the blank 5 to change a contact surface 5b against the grinding wheel 11. The blade 13 supports the blank 5 by a top slope 13a obliqued from the grinding wheel 11 to the regulating wheel 12. The grinding wheel 11 and regulating wheel 12 are rotated in the same direction as indicated by the arrows 14 and 15 in FIG. 5.

Figure 6:
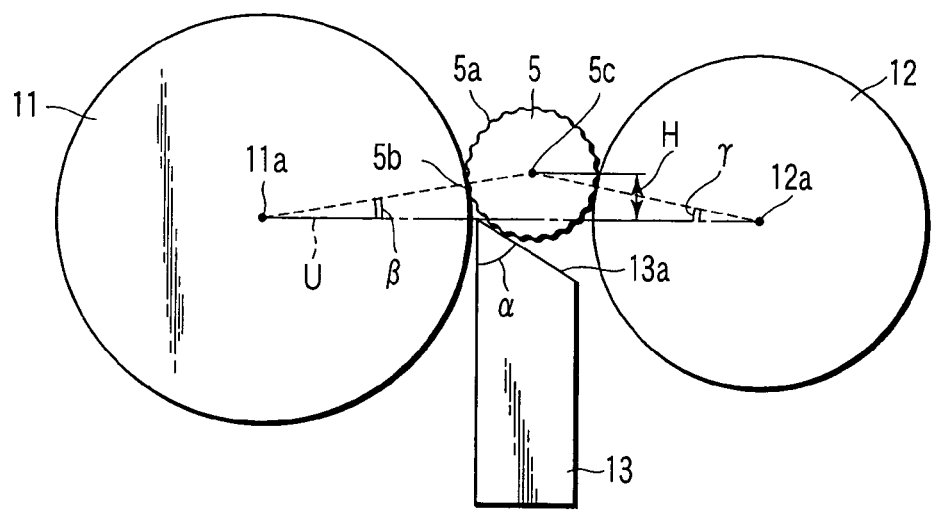
FIG. 6 is a schematic view showing the positional relationship between the shaft, a grinding wheel, a regulating wheel, and a blade shown in FIG. 5.

FIG. 6 shows the relationship between the grinding wheel 11, regulating wheel 12, blade 13 and blank 5 to be machined as the shaft 2 for a fluid dynamic bearing. The blank 5 is set contacting the grinding wheel 11, regulating wheel 12 and blade 13. The center 5c of the blank 5 is set higher by a center height H than a reference line U connecting the center 11a of the grinding wheel 11 and the center 12a of the regulating wheel 12.

The centerless grinder 10 changes the machining state by changing the grinding conditions, such as, the apex angle α of the blade 13, the center height H of the blank 5, the angle β formed by the reference line U and the line connecting the center 5c of the blank 5 to the center 11a of the grinding wheel 11 (the center height angle against the grinding wheel 11), the angle γ formed by the reference line U and the line connecting the center 5c of the blank 5 to the center 12a of the regulating wheel 12 (the center height angle against the regulating wheel 12), the tilt angle σ of the axis of rotation 17 of the regulating wheel 12 against the axis of rotation 16 of the blank 5, the rotation frequency of the grinding wheel 11, the rotation frequency of the regulating wheel 12, the grain size of the grinding wheel 11, the hardness of the regulating wheel 12, the hardness of the bonding agent of the grinding wheel 11, the grain density of the grinding wheel 11, and the depth of cut by the grinding wheel 11 against the blank 5. The apex angle α of the blade 13 is changed by replacing the blade 13 by the one having a different slope 13a set a different angle. The center height H of the blank 5 is changed by adjusting the position of the blade 13, and the distance between the centers of the grinding wheel 11 and regulating wheel 12. The center height angle β against the grinding wheel 11 is changed by replacing the grinding wheel 11 by the one having a different radius. The center height angle γ against the regulating wheel 12 is changed by replacing the regulating wheel 12 by the one having a different radius. Conventionally, in the centerless grinder 10, the grinding conditions are set to increase the circularity and cylindricality of the rod-shaped blank 5.

In this embodiment, the grinding conditions are set to generate a relative vibration, so-called a chatter, between the grinding wheel 11 for a machining tool of the centerless grinder 10 and the blank 5 machined as the shaft 2 for a fluid dynamic bearing. There are two types of chatter, a self-induced vibration generated between the blank 5 and the grinding wheel 11, and a forced vibration generated in the centerless grinder 10. When these vibrations induced during machining, the preset grinding conditions are slightly changed to meet the vibration cycle, and the machining state is periodically changed. As a result, a plurality of grooves 2b is formed and arranged around the external circumference 2a of the shaft 2. The number of the grooves 2b depends on the vibration frequency, and the depth D of the grooves 2b depends on the vibration amplitude. Therefore, it is possible to make the shaft 2 with a desired number of grooves 2b easily by adjusting the grinding conditions and controlling the chatter frequency. It is also possible to make the shaft 2 with a desired depth D of the grooves 2b by adjusting the grinding conditions and controlling the chatter amplitude. Particularly, the shaft 2 with a different number of grooves 2b can be formed by changing the relative positions of the grinding wheel 11, regulating wheel 12 and blade 13 with respect to the blank 5. The shaft 2 with a different depth D of the grooves 2b can be formed by changing the center vibration range of the grinding shaft supporting the grinding wheel 11 and the surface properties (the grain of the grinding wheel 11 and the strength of the grinding wheel bonding agent of the grinding wheel).

The chatter frequency and amplitude depend also on the characteristic frequencies of the blank 5, blade 13, member supporting the grinding wheel 11 and regulating wheel 12, and centerless grinder 10. Therefore, instead of changing the grinding conditions, it is permitted to provide a vibration control mechanism at an appropriate position in the centerless grinder 10 in order to change the characteristic frequencies. For the control of the chatter, instead of adjusting the grinding conditions, it is also permitted to induce self-induced vibration or forced vibration by controlling vibrations by adding an external vibration.

Namely, in the method of manufacturing the shaft 2 according to the present invention, the shaft 2 with grooves 2b arranged around the external circumference 2a is manufactured by controlling vibrations. Since the external circumference 2a and grooves 2b are uniformly ground along the circumference by rotating the shaft 2, the surface roughness of the external circumference 2a and the grooves 2b are uniformly finished, and the machined marks formed by grinding are aligned in the circumferential direction. As the axis of rotation 18 of the grinding wheel 11 and the axis of rotation 16 of the blank 5 are arranged parallel to each other contacting wholly from one end to the other end, the grooves 2b formed in the external circumference 2a of the shaft 2 are parallel to the axis of rotation 2c of the shaft 2. By controlling the vibration frequency and amplitude at certain levels, the grooves 2b are arranged with equal intervals in the external circumference 2a of the shaft 2. Further, by the method of manufacturing the shaft 2 according to this embodiment, the grooves 2b are formed simultaneously with machining the blank 5 with desired circularity and cylindricality.

By inclining the axis of rotation 17 of the regulating wheel 12 against the axis of rotation 16 of the blank 5, the blank 5 is fed in the direction along the axis of rotation 16 indicated by the arrow V in FIG. 5 while being grinded. This is so called through-feed grinding.

Figure 7:
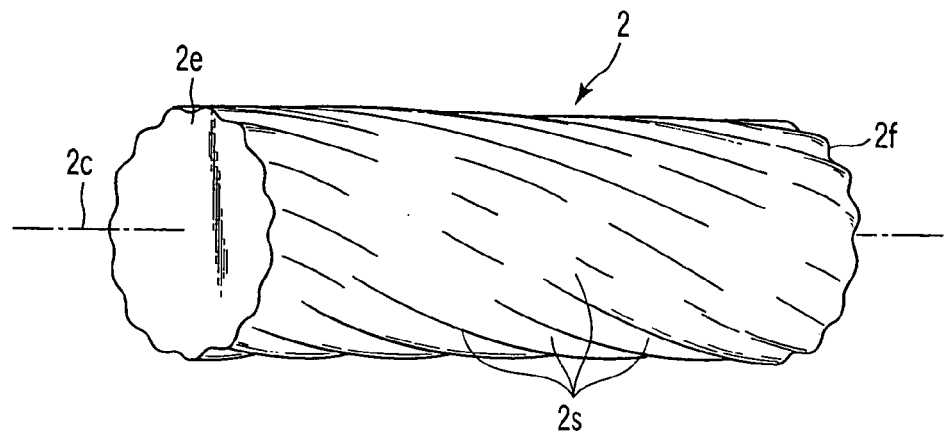
FIG. 7 is a perspective view of a shaft with spiral grooves formed by the centerless grinder shown in FIG. 5.

Through-feed grinding is executed by positioning the grinding wheel 11 to make partial contact with the total length of the blank 5, and setting the grinding conditions so that the chatter frequency becomes a value other than a natural number multiple of the frequency of the blank 5 rotating around the axis of rotation 16. In these conditions, spiral grooves 2s for example are formed as shown in FIG. 7, with which the phase in the rotating direction around the axis of rotation 2c of the shaft 2 is changed along the axis of rotation 2c.

Figure 8:
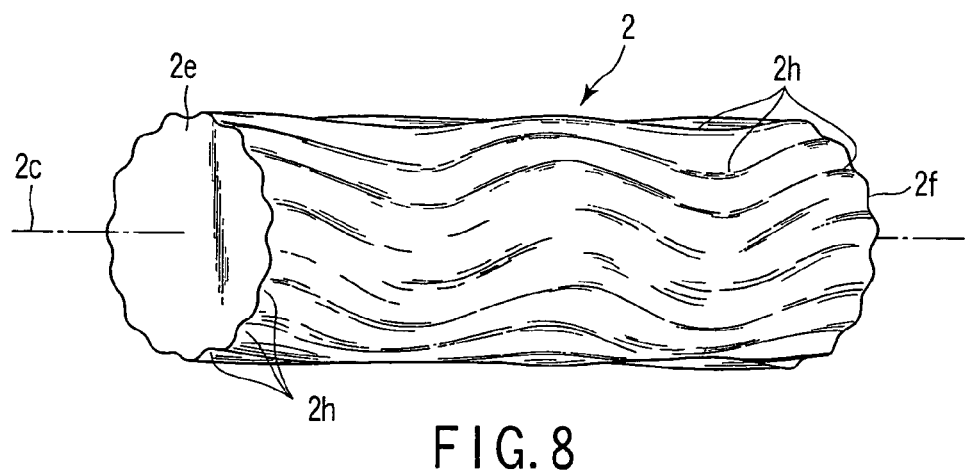
FIG. 8 is a perspective view of a shaft with waveform grooves formed by the centerless grinder shown in FIG. 5.

Namely, the shaft 2 shown in FIG. 2 is an example of forming the grooves 2b along the axis of rotation 2c by fixing the chatter frequency to a natural number multiple. When the chatter frequency is changed taking a certain natural number as a reference during the through-feed grinding, the spiral direction is changed to clockwise and counterclockwise with respect to the axis of rotation 2c. Namely, it is possible to make the shaft 2 with the grooves 2h formed like pseudo-herringbone waves as shown in FIG. 8.

Figure 9:
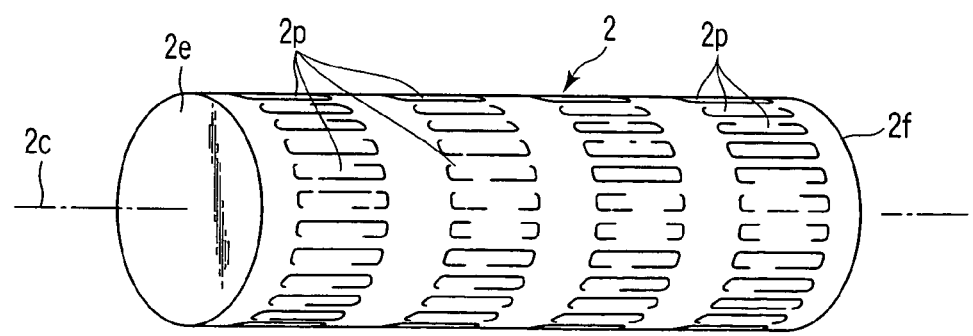
FIG. 9 is a perspective view of a shaft with continuous grooves formed at several portions by the centerless grinder shown in FIG. 5.

By generating (oscillating), controlling or changing a vibration during the through-feed grinding, it is possible to make the shaft 2 with partially continued grooves 2p as shown in FIG. 9.

Now, explanation will be given on an example of machining the shaft 2 for a fluid dynamic bearing by the centerless grinder 10. As the blank 5 machined and formed as the shaft 2 for a fluid dynamic bearing, a rod-shaped alumina ceramics with the outside diameter of about 8 mm is used. Set the center height H to 0–15 mm as a grinding condition to be changed, and count the number of grooves 2b formed in the external circumference 2a of the shaft 2. As a result, on the basis of the center height H in the condition that with no vibration (the condition to finish the shaft 2 with desired circularity and cylindricality), 3–21 grooves 2b are formed under the condition that the center H is 2–10% lower than the reference center height H, and 22–50 grooves 2b are formed under the condition that the center height H is 2–10% higher.

Deviation of rotation and durability are tested for the shaft 2 with the different number of the grooves 2b. The deviation becomes small with the increased number of the grooves 2b. However, since there is a limit in the number of the grooves 2b to generate a desired fluid dynamic according to the diameter of the shaft 2, if the number of the grooves 2b is too many, it contrarily bring about deflection of rotation easily. This test executed for the shaft 2 with the outside diameter of about 8 mm proves that the deflection of the axis of rotation is smaller than a desired value when the number of the grooves 2b is 3–40. The durability is evaluated by the rotation frequency that the deflection of rotation exceeds a preset value of tolerance. When the number of the grooves 2b is increased, the durability is lowered.

Deflection of the axis of rotation 18 of the grinding wheel 11 is changed by applying an external vibration with the center height H with which five grooves are formed as the grooves 2b. When the deflection of the axis of rotation 18 of the grinding wheel increases, the depth of the grooves becomes deep. When the deflection decreases, the depth becomes shallow.

The above described machining and results are just examples. Therefore, a shaft with desired number and depth of grooves can be easily manufactured by generating a vibration of desired frequency and amplitude by changing one or several of the grinding conditions. The grinding conditions include the rotation frequency of an regulating wheel, the hardness of an regulating wheel, the rotation frequency of a grinding wheel, the grain size of a grinding wheel, the hardness of the bonding agent of a grinding wheel, the grain density of a grinding wheel, the apex angle of a blade, the center height of blank, the center height angle against a grinding wheel, the center height angle against an regulating wheel, the tilt angle of the axis of rotation of an regulating wheel against the axis of rotation of blank, and the depth of cut by a grinding wheel against blank.

Figure 10:
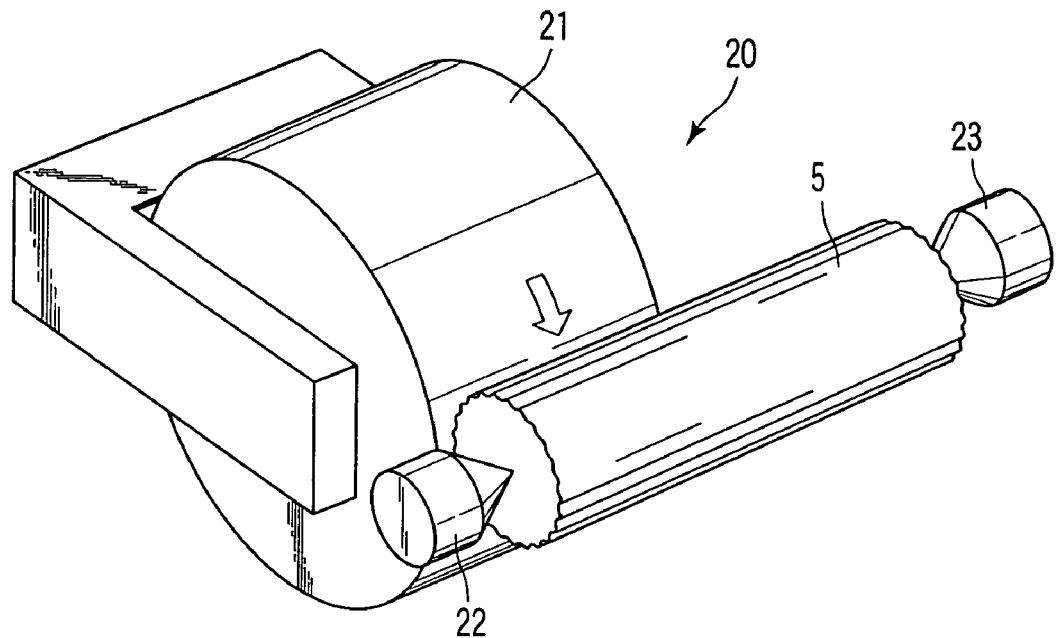
FIG. 10 is a schematic perspective view showing the state of machining the shaft shown in FIG. 3 by a cylindrical grinder.
Figure 11:
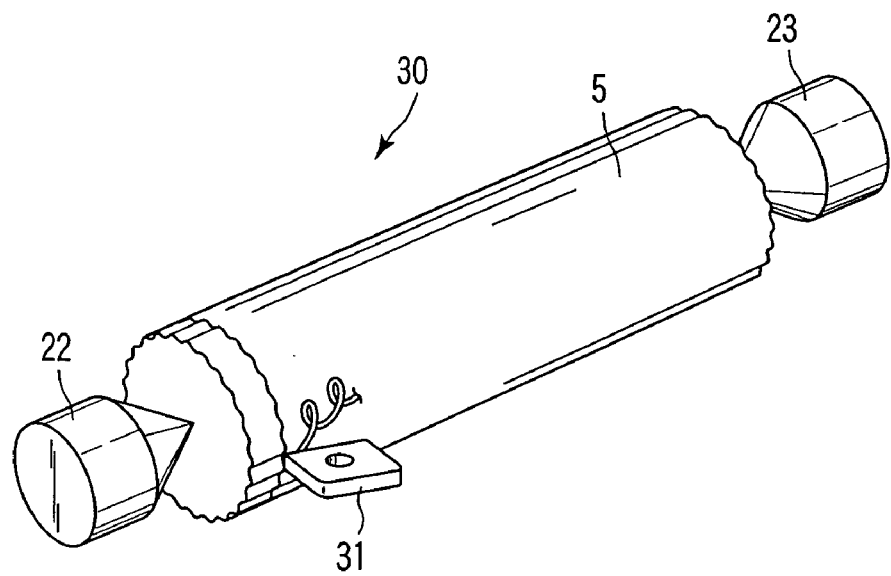
FIG. 11 is a schematic perspective view showing the state of machining the shaft shown in FIG. 3 by a cutting machine.

There are other apparatus that realizes a method of manufacturing the shaft 2 with grooves 2b formed in the external circumference 2a, by controlling the relative vibration of the blank 5 and a machining tool other than the centerless grinder 10. FIG. 10 shows schematically the state that the shaft 2 is manufactured by a cylindrical grinder 20. FIG. 11 shows schematically the state that the shaft 2 is manufactured by a cutting grinder 30. In FIG. 10, the cylindrical grinder 20 has a grinding wheel 21 as a machining tool. In FIG. 11, the cutting grinder 30 has a blade 31 as a machining tool. In either machine, the blank 5 is centered by a main shaft 22 and a tail spindle 23, and supported rotatably. In the cylindrical grinder 20, the shaft 2 is machined by the condition in which the chatter is generated between the blank 5 and the grinding wheel 21. In the cutting grinder 30, the shaft 2 is machined by the condition in which the chatter is generated between the blank 5 and blade 31. Thus, like in the centerless grinder 10, it is possible to manufacture the shaft 2 for a fluid dynamic bearing with the grooves 2b arranged in and around the external circumference 2a, the even surface roughness of the grooves 2b and external circumference 2a, and the machined marks aligned in the circumferential direction.

According to the method of manufacturing the shaft 2 of this embodiment, it is possible to execute simultaneously a process of machining the shaft 2 with desired circularity and cylindricality and a process of forming the grooves 2b in and around the external circumference 2a of the shaft 2, which are necessary to manufacture the shaft 2 for a fluid dynamic bearing with grooves 2b formed in and around the external circumference 2a, by controlling a relative vibration between the rod-shaped blank 5 to be machined as the shaft 2 for a fluid dynamic bearing and the machining tool to machine the blank 5. The method does not need a finishing process to eliminate burrs generated during forming the grooves 2b. The method permits forming a plurality of grooves 2b at one time regardless of the number of the grooves 2b.

The shaft 2 of this embodiment is just an example of the shaft 2 for a fluid dynamic bearing with the grooves 2b formed in the external circumference 2a, and the number of grooves 2b is not limited to this. It is also permitted to use water, oil or organic solvents with the viscous resistance smaller than water, other gaseous bodies such as air and inert gas, for the fluid filled in the gap 4 between the bearing 3 and the shaft 2 of the fluid dynamic bearing device 1 shown in this embodiment.

Figure 12:
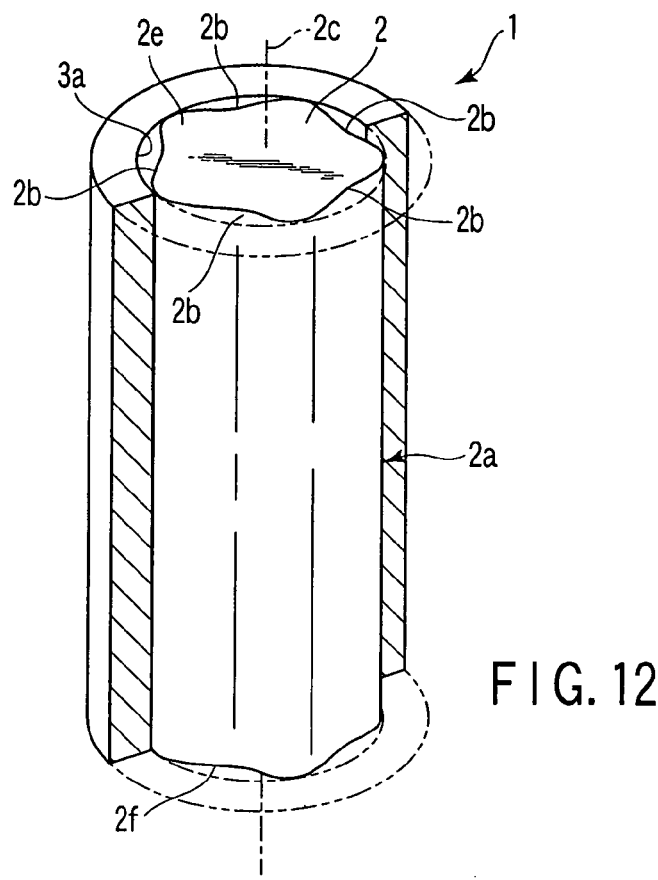
FIG. 12 is a partially sectional perspective view of a bearing of a fluid dynamic bearing device according to a second embodiment of the present invention.
Figure 13:
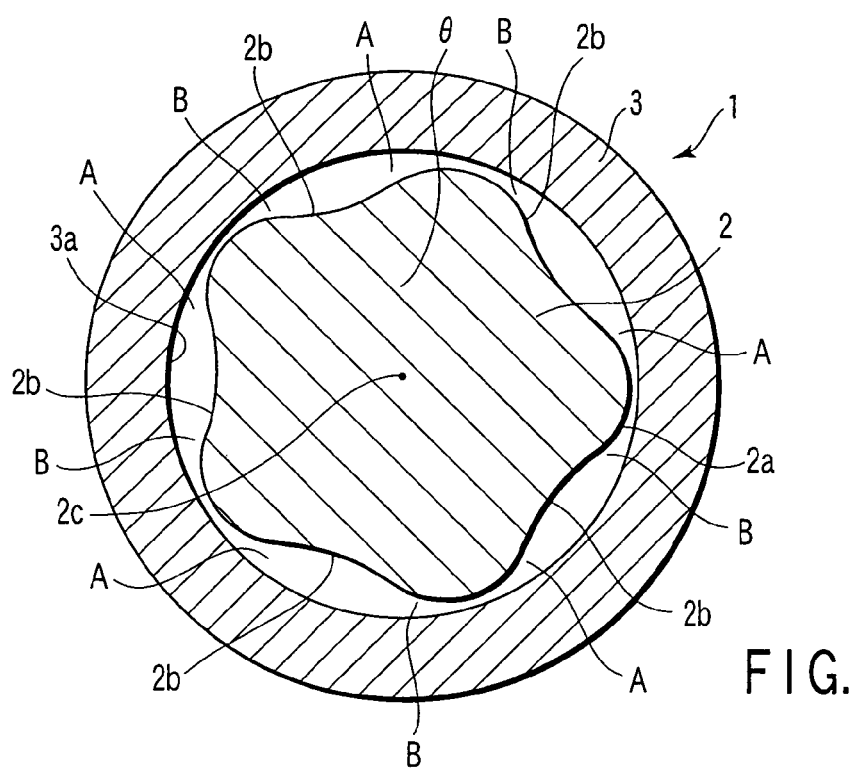
FIG. 13 is a sectional view of the fluid dynamic bearing device shown in FIG. 12, cut along the plane perpendicularly to the axis of rotation.

Now, description will be given on a fluid dynamic bearing device 1 according to a second embodiment of the present invention with reference to FIG. 2 to FIG. 17. For the components having the same functions as those in the fluid dynamic bearing device 1 according to the first embodiment, the same reference numerals will be given and description will be omitted. As shown in FIG. 12, a fluid dynamic bearing device 1 has a shaft 2 and a bearing 3. The shaft 2 has an external circumference 2a with odd number of grooves 2b more than 3 and less than 15, 5 in this embodiment as shown in FIG. 13, formed in and around the circumference in rotation symmetry centering around the axis of rotation 2c. Particularly, since the grooves are not arranged on both sides of the diameter direction by forming the odd number of grooves 2b, deflection of the axis of rotation 2c can be minimized. Each of the grooves 2b is continuously extended from one end 2e of the shaft 2 to the other end 2f in the direction across the plane perpendicular to the axis of rotation 2c.

Figure 14:
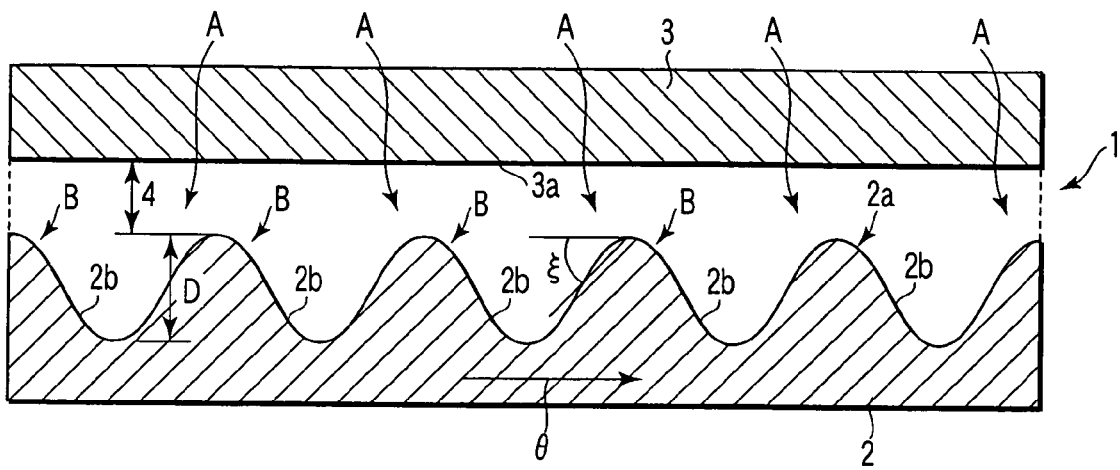
FIG. 14 is a view showing the circumferential profile of the fluid dynamic bearing shown in FIG. 12, developed from circle and magnified the change amount in the radial direction.

In this case, it is desirable that the grooves 2b are arranged in rotation symmetry with equal distance, and extended parallel, so that the distribution of the fluid dynamic generated by rotation of the shaft 2 is periodically changed along the external circumference of the shaft 2. FIG. 14 shows the profile of the external circumference 2a of the shaft 2. The profile is shown in the state that a circumscribed circle contacting the outer circumference 2a is developed as a straight line. In the profile shown in FIG. 14, the change amount in the radial direction centering around the axis of rotation 2c is extend. The profile shows the shape that the radius is smoothly and continuously changed along the rotating direction of the shaft 2.

The shape of the external circumference of the shaft 2 (the profile of the external circumference 2a) will be expressed more concretely. As shown in FIG. 14, when the average circle contacting the shape of the circumference is developed to be a straight line, the profile f(θ) of the shape of the circumference of the shaft 2 is expressed by the following polynomial:

$$f(\theta) = \sum_{n=1}^{\infty} \frac{K_n}{2} \sin(n\theta)$$

where θ is the azimuth against the axis of rotation 2c of the shaft 2 (FIGS. 13 and 14).

In this case, the following conditions shall be satisfied:

$$0.1 \le \frac{K_n}{2} \le 100 \ [\mu m]$$

$$0 < K_{n+1} \le \frac{K_n}{2} \ [\mu m]$$

$$D = f(\theta)_{MAX} - f(\theta)_{MIN}.$$

In this embodiment, the depth D of the groove 2b (the change amount in the radial direction centering around the axis of rotation) is shown larger than an actual depth in FIG. 13 and other drawings, to clarify the shape and place of the grooves 2b. For example, when air is used as a working fluid of the fluid dynamic bearing device 1, and the diameter (the maximum diameter) of the shaft 2 is about 10 mm, the depth D of the grooves 2b shown in FIG. 13 is 0.1–100 μm.

The bearing 3 has the internal circumference 3a that is larger than the cylindrical surface circumscribing the external circumference 2a of the shaft 2. The gap 4 having the sufficient size to form a film of fluid (air in this embodiment) is formed between the internal circumference 3a of the bearing 3 and the external circumference 2a of the shaft 2.

In the fluid dynamic bearing device 1 configured as described above, the sectional shapes of the grooves 2b are symmetrical to the circumference. Therefore, when the shaft 2 and bearing 3 are relatively rotated, the rotation characteristic is the same in either rotating direction. Thus the load torque acted upon start and stop of rotation is the same, and the external circumference 2a of the shaft 2 and the internal circumference 3a of the 3 come in contact with each other at the start and stop of rotation, the frictional conditions of the internal and external circumferences are the same. Hence, the durability of the fluid dynamic bearing device 1 does not differ in any rotating direction. The performance of the fluid dynamic bearing according to the time required to stabilize rotation and the rotation frequency to provide stable rotation, are the same in either rotating direction.

Since the profile along the circumference of the external circumference 2a is smoothly continued, turbulence is difficult to induce in the flow in the upstream part of the rotating direction of the grooves 2b where the distance between the external circumference 2a of the shaft 2 and the internal circumference 3a of the bearing unit 3 spreads (concretely, the part A, when the shaft 2 is rotated in the arrow direction in FIG. 13).

The shaft 2 is through-feed grinded by the centerless grinder 10 of the first embodiment shown in FIG. 5. Therefore, the surface roughness of the external circumference 2a of the shaft 2 is even, and the machined marks are aligned in the circumferential direction. The machined mark mentioned in this specification means a remarkable strip formed by the elimination machining. When the shaft 2 for the fluid dynamic bearing device 1 is rotated relatively with the bearing 3, the fluid between the external circumference 2a and grooves 2b of the shaft 2 and the internal circumference 3a of the bearing 3 flows along the machined marks. Therefore, turbulence is difficult to induce between the shaft 2 and the bearing 3, and separation of flow is difficult to induce in the downstream side. Thus, the axis of rotation 2c is easy to stabilize in a wide range from a low frequency range where the rotation speed is slow, to a high frequency range where the rotation speed is fast, with respect to the relative rotation speed of the shaft 2 and the bearing 3.

In order to reduce the weight, at least one of the shaft 2 and the bearing 3 is made of alumina, silicon nitride, zirconia, aluminum nitride, case hardening steel, spring steel, alloy tool steel, maraging steel, titanium alloy, aluminum, stainless alloy, or at least one of the materials made by coating the base metal of these materials by plating or spraying.

It is preferable to apply these materials to at least the rotating element particularly for facilitating acceleration and deceleration of the fluid dynamic bearing device 1. Alloy tool steel is a material corresponding to SKD and SKS alloy tool steel materials classified by Japan Industrial Standards.

Figure 16:
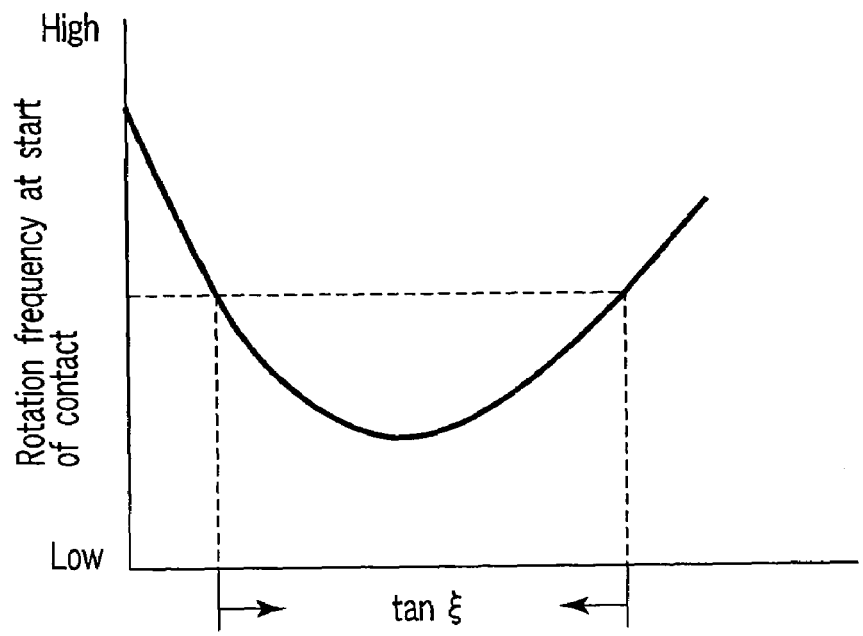
FIG. 16 is a graph showing the relationship between the change rate of circumference shape and the rotation frequency at start of contact, in the fluid dynamic bearing shown in FIG. 12.
Figure 17:
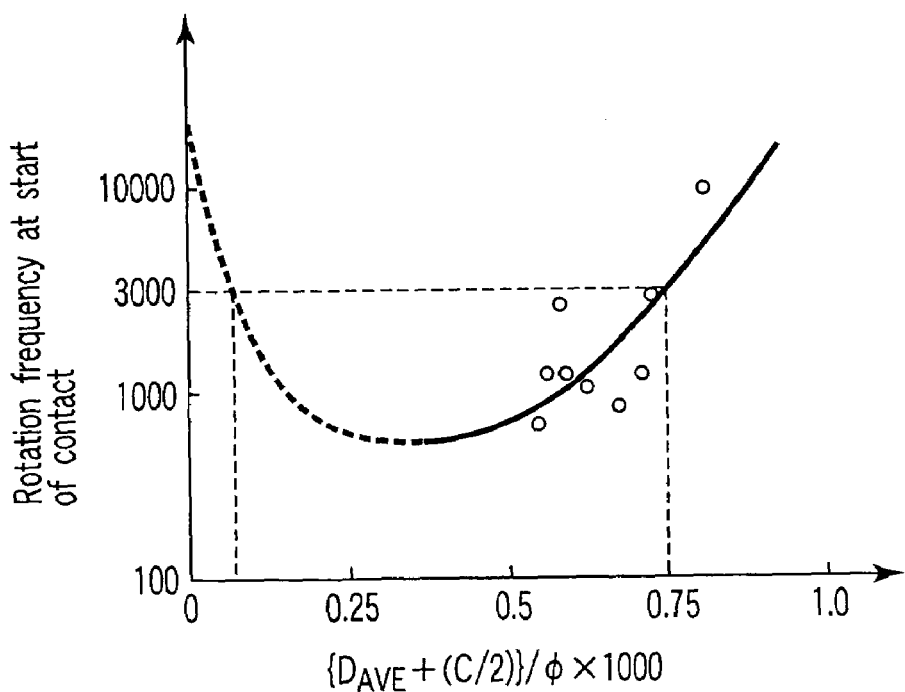
FIG. 17 is a graph showing the relationship between the index indicating the shaft stability and the rotation frequency at start of contact, in the fluid dynamic bearing shown in FIG. 12.

We have made an experiment to choose an appropriate range, assuming that the average dimension of the depth D of the grooves 2b is $D_{AVE}$, the diameter (hereinafter referred as an outside diameter) of a cylindrical surface circumscribing the external periphery 2a is Φ, and the average dimension of the diameter clearance between the cylindrical surface and internal circumference 31 is C. The results are shown in FIG. 15 to FIG. 17.

In the experiment, the shaft 2 is a rotating element, and the bearing 3 is a fixed element. The shaft 2 used for the experiment is 8 mm in the outside diameter Φ and 5 in the number of grooves n. Two or more bearings 3 used have the average dimension C of about 5 μm between the outside diameter Φ of the shaft 2 and the diameter of the internal circumference 3a (hereinafter referred as an inside diameter). For each condition, a fluid dynamic was measured with a rotation frequency of 24000 rpm. After increasing the rotation frequency up to 24000 rpm, stopped supplying the driving force, and then measured the contact start rotation frequency when the shaft 2 decelerated and comes in contact with the bearing 3.

Figure 15:
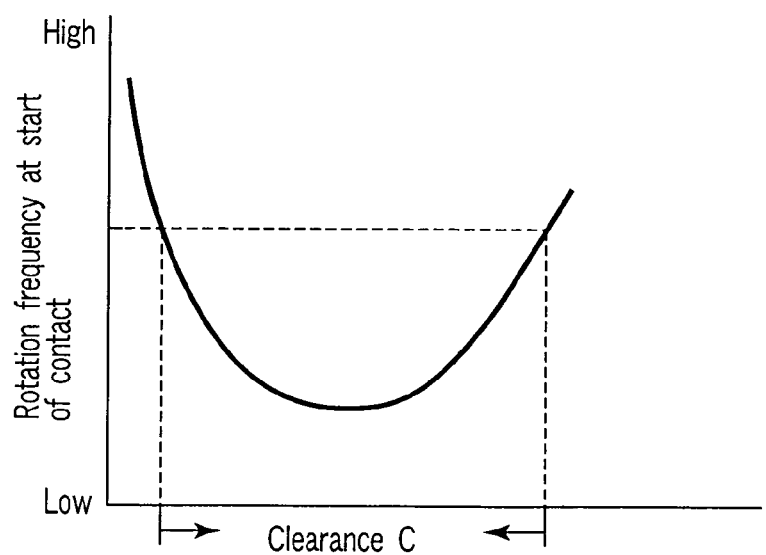
FIG. 15 is a graph showing the relationship between a clearance and a rotation frequency at start of contact, in the fluid dynamic bearing shown in FIG. 12.

As shown in FIG. 15, when the clearance C becomes small, the axis of rotation slightly deflects and the shaft 2 comes in contact with the bearing 3, and the contact start rotation frequency increases. When the clearance C increases over a certain value, the fluid dynamic between the shaft 2 and the bearing 3 decreases, the axis of rotation is likely to deflect, and the contact start rotation frequency increases.

The depth D of the grooves 2b is expressed by tan ξ≈2 nD/πΦ, where tan ξ is the change rate in the radial direction of the external circumference 2a, Φ is the outside diameter of the shaft 2, and n is the number of grooves. In the downstream part B where the grooves 2b become shallow, when the value of tan ξ increases, the pressure between the shaft 2 and the bearing 3 increases. In the upstream part A where the grooves 2b change in the direction to become deep, when the value of tan ξ increases, the pressure between the shaft 2 and the bearing 3 decreases. Further, in the upstream part A, when the value of tan ξ exceeds a certain value, turbulence induce in the flow between the shaft 2 and the bearing 3, the pressure distribution around the axis of rotation becomes unstable, the axis of rotation deflects and the shaft 2 becomes easy to come in contact with the bearing 3. therefore, the contact start rotation frequency decreases as the change rate tan ξ increases from zero as shown in FIG. 16, and becomes minimum at a certain value, and then increases gradually.

Therefore, the contact start rotation frequency, which is an index of the stability of the shaft 2 by the distribution of the fluid dynamic generated between the shaft 2 and the bearing 3, is expressed by the clearance C and change rate tan ξ, or the functions taking the average depth $D_{AVE}$ of the grooves 2b as a variable.

The average depth $D_{AVE}$ and clearance C are set to $\{D_{AVE}+(C/2)\}/\Phi$, the contact start rotation frequency was plotted as shown in FIG. 17. It shows that when there is a relation $\{D_{AVE}+(C/2)\}/\Phi \leq 7.5 \times 10-4$, the contact start rotation frequency decreases to lower than 3000 rpm. As a result of the experiment, the relation was effective in the shaft 2 rotation frequency range of 100–100000 rpm.

Figure 18:
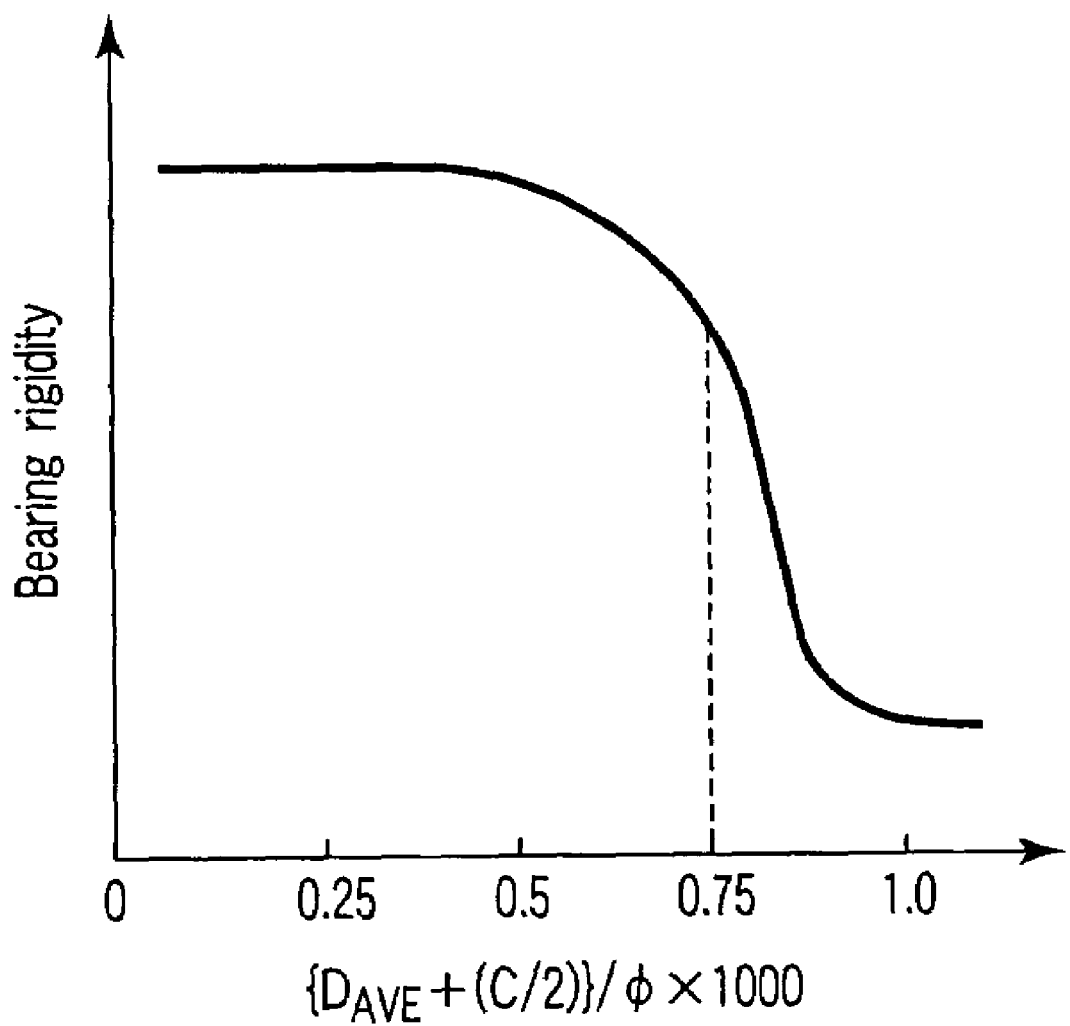
FIG. 18 is a graph showing the relationship between the index indicating the shaft stability and the rigidity of the shaft, in the fluid dynamic bearing shown in FIG. 12.

Considering the precision limit in fitting a shaft and a bearing, the limit in the practical manufacturing range of average depth $D_{AVE}$ and clearance C is in the submicron order of 0.1 μm. Considering the decrease in the volume of the shaft supporting medium existing between the shaft and the bearing, the energy volume convertible to a fluid dynamic decreases extremely in the range where the clearance C is very small. Similarly, even if the average depth $D_{AVE}$ is increased while the clearance C is very small, the grade of flow velocity in the clearance direction is increased, and a fluid dynamic is not efficiently generated. As a result, as shown in FIG. 18, the bearing rigidity that is the shaft supporting force can merely take a certain value, even if $\{D_{AVE}+(C/2)\}/\Phi$ becomes smaller than 0.25, for example.

If the bearing rigidity is constant, the contacting state between the shaft and the bearing relates only to the value of clearance. During a stationary rotation, a certain whirling that may be caused by an unbalanced rotary body is induced. If the clearance is smaller than the whirling, the shaft and bearing come in contact with each other. As a result, in a range where $\{D_{AVE}+(C/2)\}/\Phi$ is small, an increase of contact rotation frequency is presumed.

The upper and lower limits of the clearance C are set from FIG. 15. Based on the upper and lower limits of the clearance C, the upper and lower limits of the depth D of the grooves 2b are determined from FIG. 16. Based on the depth D and FIG. 16, the number n of grooves 2b corresponding to the outside diameter Φ of the shaft 2 is determined.

As described above, according to the shaft for a fluid dynamic bearing according to the present invention, the grooves are arranged in and around the external circumference, the surface roughness of the grooves and external circumference are uniform, and the machine marks are aligned in the circumferential direction. Therefore, when this shaft is used for a fluid dynamic bearing device, the shaft rotates relatively to the bearing of a fluid dynamic bearing device, the flow of fluid generated between the shaft and bearing advances along the machined marks, and turbulence is difficult to induce. The axis of rotation of a fluid dynamic-bearing device is easy to stabilize and deflection of the axis of rotation can be minimized in the state that the rotation frequency of a fluid dynamic bearing-device is high (the rotation speed is fast). A fluid dynamic-bearing device having the shaft according to the invention provides the same effect as the above.

In the shaft for a fluid dynamic-bearing device according to the invention, as grooves are continuously formed in at least a part of the shaft, the shaft is held by the fluid dynamic of fluid in a wide range along the center of the shaft, and the axis of rotation is easy to stabilize. With the shaft having grooves arranged with equal intervals in the peripheral direction, the fluid dynamic acting in the space to the internal circumference of the bearing can be acted uniformly on the shaft. With the shaft having grooves formed parallel to the center of the shaft, the peripheral deflection of the axis of rotation can be controlled to small. With the shaft having grooves whose phase in the rotating direction centering around the shaft is changed along the center of the shaft, the fluid dynamic acting in the space to the bearing is homogenized in the direction of the center of the shaft, and total deflection of the axis of rotation can be controlled to small. With the shaft having grooves formed so that the external circumference is changed smoothly and periodically in the radial direction along the circumference, the external circumference and grooves are smoothly continued, and turbulence is difficult to induce in the flow in the downstream side of the rotating direction from the external circumference to the grooves where the gap between the shaft and the bearing spreads, and separation of flow is difficult to be caused by the flow in the grooves. Therefore, the axis of rotation is easy to stabilize in the fast to slow rotation speed ranges.

In the method of manufacturing the shaft according to the present invention, a shaft for a fluid dynamic bearing device having grooves formed in and around the external circumference, by controlling the vibration generated between a blank to be machined as a shaft for a fluid dynamic bearing device and a machining tool to machine the external circumference of the blank. Therefore, it is possible to perform simultaneously a step of machining a shaft with desired circularity and cylindricality, a step of forming grooves in the external circumference of a shaft, and a finishing step of removing burrs generated during forming the grooves. Since the steps that are conventionally separately can be simultaneously performed, the machining cost can be reduced. Further, since a plurality of grooves can be formed at one time regardless of the number of grooves, the machining cost is not increased.

In the shaft for a fluid dynamic bearing device according to the invention, a high pressure area generates in the part from the grooves to the external circumference where the radius increases, and a low pressure area generates in the part from the external circumference to the grooves where the radius decreases. That is, a fluid dynamic is generated when the shaft is rotated, and a high pressure area and low pressure area appear alternately at a fixed position in the external circumference of the shaft. The shaft intentionally creates a pressure distribution in the peripheral direction of the shaft, thereby controlling a half whirl.

Since the profile along the peripheral direction, which is developed on straight line with the magnified of the change amount in the radial direction, is formed to change gently and periodically in the radial direction, turbulence is difficult to be created in the flow in the downstream side of the rotating direction from the external circumference to the grooves. Further, as the grooves are formed continuously from one end to the other end of the shaft in the direction across the plane perpendicular to the rotation shaft, there is no factor to induce turbulence and separation layer in the shaft.

Therefore, in the structure of the fluid dynamic bearing device having the shaft according to the invention, the fluid dynamic generated between the shaft and the bearing is easy to stabilize in the low to high rotation frequency ranges where the rotation speeds are slow and high, respectively.

That is, as the axis of rotation of the fluid dynamic bearing is stable, and the rotation frequency at the start of contact between the shaft and the bearing is decreased, the number of hitting times that are happened between the shaft and the bearing at the start and stop of rotation of the fluid dynamic bearing is decreased, and the durability of the fluid dynamic bearing is improved.

What is claimed is:

1. A shaft for a fluid dynamic bearing comprising:
a plurality of grooves arranged in and around the external circumference,
a surface of the grooves and external circumference with a uniform roughness, and
machined marks continuously formed on the surface of the plurality of grooves and the external circumference aligned in the circumferential direction.

2. The shaft for the fluid dynamic bearing according to claim 1, wherein said plurality of grooves is formed continuously in at least a part of the shaft.

3. The shaft for the fluid dynamic bearing according to claim 1, wherein said plurality of grooves is arranged with equal intervals in and around the circumference.

4. The shaft for the fluid dynamic bearing according to claim 1, wherein said plurality of grooves is formed parallel to the center of the shaft.

5. The shaft for the fluid dynamic bearing according to claim 1, wherein said plurality of grooves is formed so that the phase in the rotating direction centering around the shaft changes along the center of the shaft.

6. The shaft for the fluid dynamic bearing according to claim 1, wherein said plurality of grooves is formed so that the external circumference is changed to be a sine wave in the radial direction along the circumference.

7. The shaft for a fluid dynamic bearing according to claim 1, wherein the diameter $\Phi$ of a circumscribed circle of the shaft is in a range of 1–50 mm.

8. The shaft for a fluid dynamic bearing according to claim 1, wherein the plurality of grooves generate a fluid dynamic when rotated relatively to a bearing externally inserted onto the shaft centering on the axis of rotation, said grooves being extended by a certain length on the external circumference in the direction along the axis of rotation, the radius of the shaft being gently changed along the circumference, and the depth D of the grooves which is a dimensional difference between the maximum value and minimum value of the radius being in a range of 0.1–100 μm.

9. The shaft for a fluid dynamic bearing according to claim 8, wherein the profile f(θ) of the external circumference along the direction across perpendicularly the axis of rotation is expressed by the equation, assuming that an average circle circumscribing the profile is developed to be a straight line, and the azimuth is θ, where $$f(\theta) = \sum_{n=1}^{\infty} \frac{K_n}{2} \sin(n\theta)$$

and in this case, the following conditions are satisfied $$0.1 \leq \frac{K_n}{2} \leq 100 \ [\mu m]$$

$$0 < K_{n+1} \leq \frac{K_n}{2} \ [\mu m]$$

$$D = f(\theta)_{MAX} - f(\theta)_{MIN}.$$

10. The shaft for a fluid dynamic bearing according to claim 8, wherein the number of the grooves is an odd number selected from 3 to 15.

11. The shaft for a fluid dynamic bearing according to claim 9, wherein the number of the grooves is an odd number selected from 3 to 15.

12. The shaft for a fluid dynamic bearing according to claim 1, wherein the plurality of grooves and external circumference form an external shape having odd number of said grooves extending continuously from one end to the other end in the direction across the plane perpendicularly to the axis of rotation, said grooves being arranged in rotation symmetry centering on the axis of rotation; and a profile in the circumferential direction, which is developed expanding the change amount in the radial direction centering on the axis of rotation, formed like a sine wave.

13. The shaft for a fluid dynamic bearing according to claim 12, wherein the number of the grooves is an odd number selected from 3 to 15.

14. A fluid dynamic bearing device, comprising:
a shaft which has a plurality of grooves arranged in and around the external circumference, a surface of the grooves and external circumference with a uniform roughness, and machined marks continuously formed on the surface of the plurality of grooves and external circumference aligned in the circumferential direction; and
a bearing which has a cylindrical internal circumference surrounding the external circumference of the shaft.

15. The fluid dynamic bearing device according to claim 14, wherein said plurality of grooves generate a fluid dynamic when rotated relatively to the bearing centering on the axis of rotation; the grooves are extended by a certain length in the external circumference in the direction along the axis of rotation; the radius of the shaft is gently changed along the circumference; and the depth D of the grooves which is a dimensional difference between the maximum value and minimum value of the radius is in a range of 0.1–100 μm.

16. The fluid dynamic bearing device according to claim 15, wherein the bearing is fixed, and the shaft is rotated.

17. The fluid dynamic bearing device according to claim 15, wherein a diameter of a cylindrical surface circumscribing the shaft, an average depth which is an average value of the maximum dimensions in the radial direction from the cylindrical surface to the external circumference, and an average dimension of the diameter clearance between the internal circumference of the bearing and the cylindrical surface have a following relationship, assuming the diameter is $\Phi$, the average depth is $D_{AVE}$, the average dimension of the diameter clearance is C, $$\{D_{AVE} + (C/2)\}/\Phi \leq 7.5 \times 10^{-4}.$$

18. The fluid dynamic bearing device according to claim 15, wherein at least one of the shaft and the bearing is made of alumina, silicon nitride, zirconia, aluminum nitride, case hardening steel, spring steel, alloy tool steel, maraging steel, titanium alloy, aluminum, stainless steel, or at least one of the materials made by coating the base metal of these materials by plating or spraying.

* * * * *